No. 629,876. Patented Aug. 1, 1899.
T. SCHUBERT.
MILK COOLING APPARATUS.
(Application filed Mar. 29, 1899.)
(No Model.) 3 Sheets—Sheet 1.
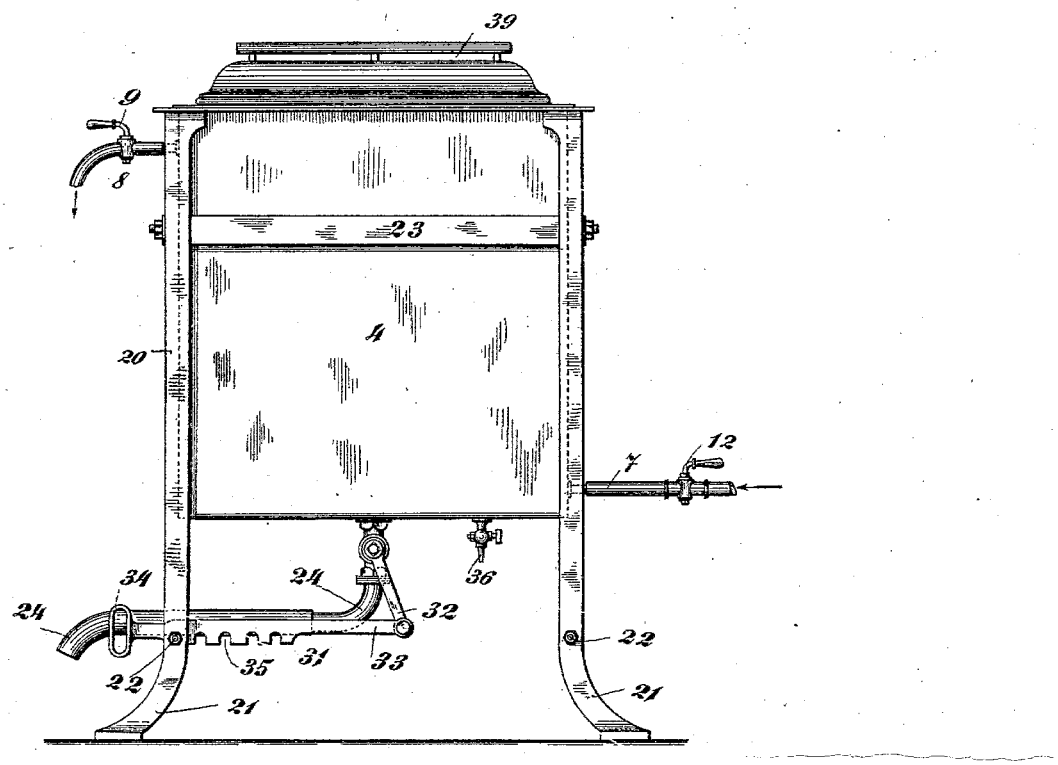
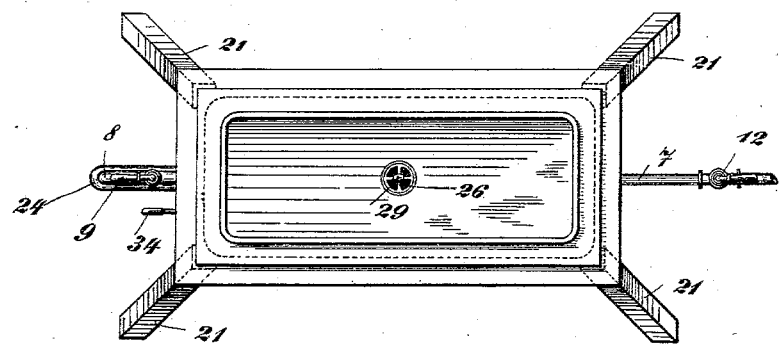

No. 629,876. Patented Aug. 1, 1899.
T. SCHUBERT.
MILK COOLING APPARATUS.
(Application filed Mar. 29, 1899.)
(No Model.) 3 Sheets—Sheet 2.

Witnesses: Inventor.
Theodor Schubert

No. 629,876. Patented Aug. 1, 1899.
T. SCHUBERT.
MILK COOLING APPARATUS.
(Application filed Mar. 29, 1899.)
(No Model.) 3 Sheets—Sheet 3.
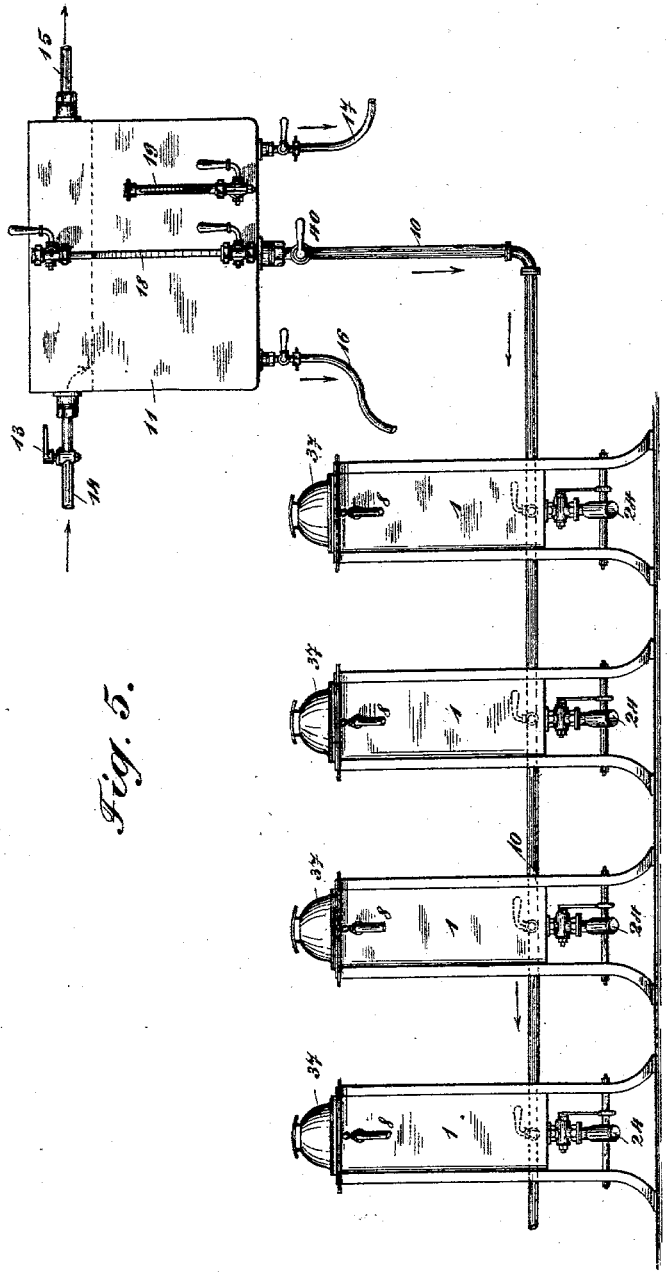
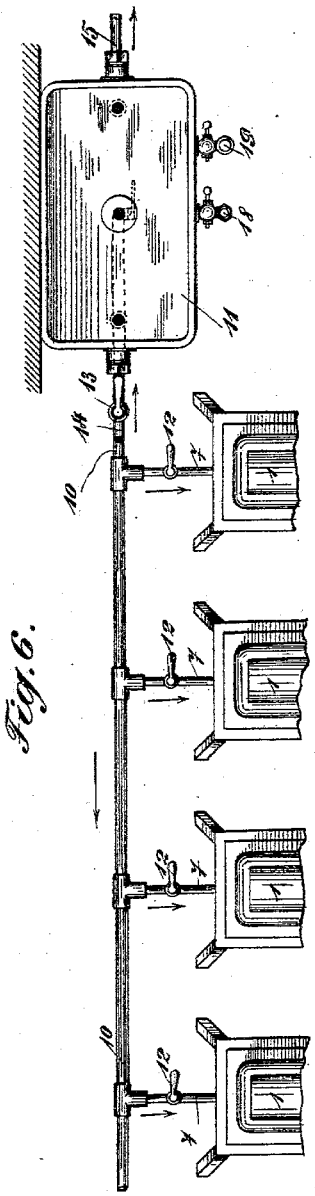
Witnesses:
Inventor:
Theodor Schubert
by
Atty.

UNITED STATES PATENT OFFICE.

THEODOR SCHUBERT, OF WALD, SWITZERLAND.

MILK-COOLING APPARATUS.

SPECIFICATION forming part of Letters Patent No. 629,876, dated August 1, 1899.

Application filed March 29, 1899. Serial No. 710,914. (No model.)

*To all whom it may concern:*

Be it known that I, THEODOR SCHUBERT, a citizen of the Republic of Switzerland, residing at Wald, near Zurich, in the Republic of Switzerland, have invented certain new and useful Improvements in and Connected with Milk-Cooling Apparatus, (for which I have applied for a patent in the following countries: Switzerland, on the 5th of September, 1898; France, on the 4th of March, 1899; Italy, on the 4th of March, 1899; Great Britain, on the 4th of March, 1899; Austria, on the 6th of March, 1899, and Belgium, on the 6th of March, 1899,) of which the following is a specification.

This invention has for its object a milk-cooling apparatus, which, as compared with the apparatuses for cooling milk hitherto employed, is characterized by a simple and yet practical construction, enabling a thoroughly even cooling of the milk to be obtained with an easy control and regulation of the cooling itself. In this arrangement a number of double-walled milk cans or containers are employed, the space between the double walls serving to receive a suitable cooling or refrigerating medium and each space or chamber being provided with a supply and draw-off pipe for the cooling medium for the purpose of easily filling and emptying the said spaces or chambers. The discharge-pipe itself is separate for each vessel, while the feed or supply pipes of all the vessels are connected, by means of a single pipe, with a reservoir for the cooling medium. In order to obtain a given temperature, the quantity of the cooling medium flowing through the space between the double walls is regulated. One form of construction of such a milk-cooling apparatus is shown as an example in the accompanying drawings.

Figure 2:
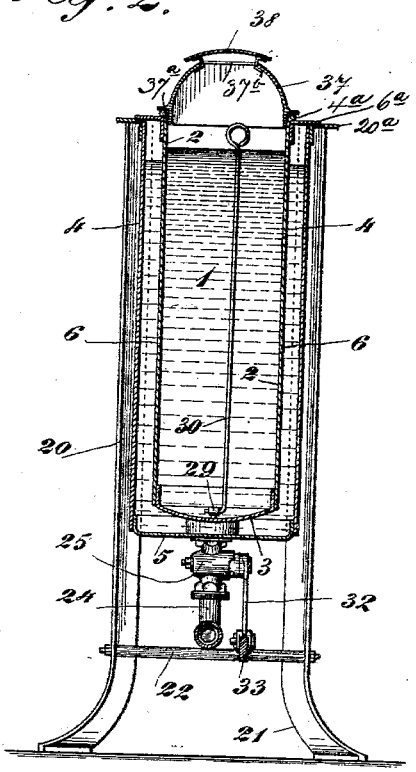
Figure 4:
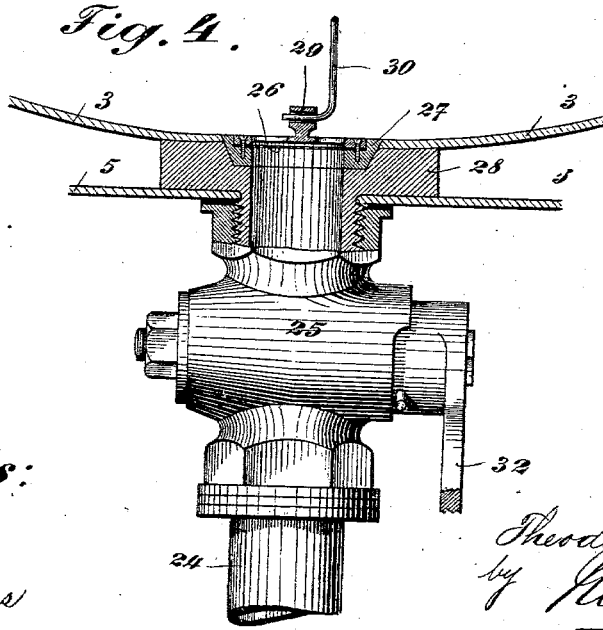

Figure 1 is a front view of a milk-container; Fig. 2, a vertical cross-section of the same; Fig. 3, a plan view of the same, the cover of the apparatus being removed; Fig. 4, a detail view; Fig. 5, an elevation of an apparatus with four milk-containers; Fig. 6, a plan view of Fig. 5.

The milk vessels 1 of the apparatus are made with double walls in such a way that an outer wall 4, with a bottom 5, stands at a certain distance from the inner wall 2 and bottom 3. These milk-containers are of flat rectangular longitudinal section, so that a rapid cooling of the milk contained in the vessels can be obtained from both longitudinal sides 6, as these walls 6 afford a great cooling-surface and the distance between the two is comparatively small. The space between the outer and inner walls of the vessel serves for receiving a cooling medium for which a supply and draw-off pipe is arranged on each receptacle. These pipes are formed by pipes 7 and 8, which are screwed on nozzles arranged at suitable places on the wall 4. It is preferable to arrange the draw-off pipe 8 pretty near the upper edge of the vessel, while the supply-pipe 7 is arranged next the bottom 5.

The draw-off pipes 8 are arranged separately for each vessel and are each provided with a regulating-tap 9, while the supply-pipes 7, Figs. 5 and 6, of the various vessels are connected with a reservoir 11 by means of a single pipe 10, and each provided with a tap 12, similarly to the draw-off pipes 8, in order to regulate the supply of the cooling medium. Of course in order to regulate the quantity of the cooling medium passing through each vessel use must first be made of these last-named taps 12 and the other taps 9 held in reserve.

The reservoir 11, which is intended for receiving the cooling medium, is formed of a box which is provided near its upper edge with a supply-pipe 14, capable of being regulated by a tap 13, and opposite this supply-pipe with a discharge-pipe 15. The latter serves for carrying off the cooling medium in the case of any stoppage of the draw-off pipe. The draw-off pipe 10 is connected with the bottom of the reservoir 11, and there are provided on the right and left of the same two further pipes 16 and 17, having for their object to convey the cooling medium to different places—for instance, for washing butter or the like. The quantity of the cooling medium passing from the reservoir 11 into the pipe 10 may be regulated by means of a tap 40.

The front wall of the reservoir is provided with a water-gage glass 18 and a thermometer 19, by means of which the height of the liquid and the temperature of the cooling medium in the reservoir may be ascertained at any time. From the water-gage glass 18 it may be seen whether the inflow of the cooling medium has ceased or the discharge-pipe 15 is stopped up.

It will be observed that the cooler 4 has at its upper end an encompassing flange $4^a$, which has bearing on a flange $20^a$ at the upper end of the four corner-posts 20, of angle-iron, whose lower end is bent outwardly to form feet 21, said corner-posts being connected or braced together into a framing by means of cross-braces 23, Fig. 1, bolted to said corner-posts near their upper ends, and by means of brace-rods 22, whose outer ends are screw-threaded and pass through one of the flanges of the angle-iron corner-posts near their lower ends, to which posts said brace-rods are secured by means of nuts, as shown, thus firmly clamping the cooler 4 to the framing, within which said cooler is suspended by the aforesaid flange $4^a$. It is obvious that by simply loosening some of the nuts on the braces 23 and brace-rods 22 the cooler 4 can be readily removed. The milk vessel 6 is likewise provided at its upper end with an encompassing flange $6^a$, which has bearing on the flange $4^a$ of the cooler, and thus not only forms a closure for the upper end of said cooler, but also a support from which said vessel is suspended, so that it also can be readily lifted out of the cooler, while the framing itself may be readily dismembered for shifting the apparatus from one place to another or for transportation or storing. Between these feet 21 there is arranged a discharge-pipe 24 for the cooled milk, which may be closed by means of a tap 25. Over the mouth of this pipe, inside the milk-can, there is a movable sieve 26, which has for its object to retain the cream. This sieve 26 is fixed in a conical ring 27, which has its seat in the bottom piece 28, arranged between the floors 3 and 5, Fig. 4, and which is provided with a stirrup or cross-piece 29, having an eye in which a wire 30, extending to the top, is engaged in order to allow of the withdrawal of the conical ring with the sieve.

As shown in Figs. 2 and 4, the bottom of the milk vessel or container 6 is concavo-convex, and the so-called "bottom" or "union-piece" 28 has its inner face concave and the inner end of its bore enlarged and of increasing cross-sectional area in an inward direction, forming a conical seat for the aforesaid conical ring-frame 27, to which the straining fabric 26 is secured. By means of this construction the discoidal portion of the union-piece 28 forms a seat for the milk vessel, assists in supporting the same, and at the same time forms a separable yet fluid-tight joint between it and the discharge-pipe, so that said vessel may be readily removed from the cooling vessel without interfering with the discharge-pipe connections, while leakage from the milk vessel into the cooling vessel is effectually prevented by the conical seat in said union-piece and by the conical ring-frame of the strainer, as will be readily understood.

The tap 25 is provided with a fixing device 31, Fig. 1, which allows of the cock-plug being adjusted and fixed in various positions. This fixing device 31 has a lever 32, mounted on the cock-plug, on which a draw-bar 33, having a handle 34, is pivoted, said draw-bar being provided with notches 35, by means of which the draw-bar can be fixed in various positions on a cross-bolt 22.

For the purpose of discharging the chamber between the double walls containing the cooling medium a discharge-tap 36 is arranged on the bottom 5.

The cover 37 for the milk vessel or container 6 is dome-shaped in cross-section, and has an encompassing flange $37^a$ above its lower edge, which latter fits into said vessel, said flange bearing on the upper, preferably beaded, edge of the milk vessel. The cover 37 has an opening $37^b$, extending the full length thereof, which opening is covered by a concavo-convex plate 38 of greater length and width than said opening and is secured to the cover by means of spacing standards or feet, so as to leave a clear space between the two for free access of air to the milk vessel.

The walls of the milk-containers are made of sheet-copper, sheet-zinc, or the like, but preferably of enameled sheet-iron. In the latter case the vessel is more easily and conveniently kept clean.

Water which may be cooled by the action of ice is preferably employed as the cooling medium.

To prevent solid substances held in suspension in or carried by the refrigerant into the tank or reservoir 11 from reaching the distributing-pipes 10, 16, and 17, the ports leading thereto may be and in practice are provided with strainers constructed and arranged like the one applied to the milk-discharge port hereinabove described, and in view of this I have deemed it unnecessary to illustrate the same.

By the arrangement hereinbefore described an even distribution of the cooling action in the various vessels is obtained, as they are connected by a single pipe with the reservoir for the cooling medium, and the temperature of the cooling medium is easily controlled, as for this object it is only necessary to read off the temperature indicated by the thermometer on the reservoir. The desired temperature in the containers may be attained by regulating the quantity of the cooling medium flowing through the double walls. This regulating in a convenient and precise manner is rendered possible by means of the many taps shown in this arrangement. The arrangement may also be such that the milk vessels instead of being all on one side of the reservoir may be arranged half on one side and half on the other.

What I claim is—

1. A milk-cooling apparatus comprising a cooling vessel provided with an encompassing flange at its upper end, a support for said vessel on which said flange has bearing, a milk vessel smaller than the cooling vessel and like it provided with an encompassing flange at its upper end having bearing on the like flange of the cooling vessel and forming a closure for its upper end, means for discharging the contents of the milk vessel through the bottom of the cooling vessel, and means for inducing a circulation of a cooling agent through said cooling vessel around the milk vessel, for the purpose set forth.

2. A milk-cooling apparatus comprising a cooling vessel of polygonal form and having an encompassing flange at its upper end, and a stand for said vessel comprising four angle-iron posts fitting the corners of said vessel, whose flange seats on the upper end of said posts, and clamping devices for clamping the posts to said vessel; in combination with a milk vessel, having likewise an encompassing flange at its upper end seating on the corresponding flange of the cooling vessel, said milk vessel smaller than said cooling vessel, for the purpose set forth.

3. A milk-cooling apparatus comprising a cooling vessel provided with an encompassing flange at its upper end, a support for said vessel on which said flange has bearing, a milk vessel smaller than the cooling vessel and like it provided with an encompassing flange at its upper end having bearing on the like flange of the cooling vessel and forming a closure for its upper end, means for discharging the contents of the milk vessel through the bottom of the cooling vessel, and means for inducing a circulation of a cooling agent through said cooling vessel around the milk vessel, and a cover for the latter, dome-shaped in cross-section and provided with the opening 37$^b$ and the cover-plate 38 for said opening, for the purpose set forth.

4. A milk-cooling apparatus comprising a cooling vessel, a support therefor, a milk vessel smaller than and suspended in said cooling vessel, a discharge-pipe connected with the bottom of the milk vessel and extending through the bottom of the cooling vessel, a stop-cock in said pipe, means for adjusting said stop-cock to regulate the flow through the pipe, means for locking the adjusting device against displacement, and a strainer covering the inlet to the discharge-pipe, said strainer removably seated in said inlet, for the purpose set forth.

5. A milk-cooling apparatus comprising a cooling vessel, a support therefor, a milk vessel smaller than and suspended in said cooling vessel, a discharge-pipe in communication with the milk vessel through its bottom and extending through the cooling vessel, and means whereby said milk vessel can be removed from the cooling vessel without interfering with the discharge-pipe connection, substantially as set forth.

6. A milk-cooling apparatus comprising a cooling vessel, a support therefor, a milk vessel smaller than and supported within said cooling vessel both provided with an opening in their bottoms, a discoidal union-piece forming a seat for the milk vessel and having an exteriorly-threaded sleeve extension projecting through the opening in the bottom of the cooling vessel the bore of said union-piece being in register with the opening in the bottom of the milk vessel, and a discharge-pipe screwed to the sleeve extension of the union-piece, for the purpose set forth.

7. A milk-cooling apparatus comprising a cooling vessel, a support therefor, a milk vessel smaller than and suspended in said cooling vessel, said milk vessel having a concavo-convex bottom and both vessels having an opening in their bottoms, and a discoidal union-piece having a concave upper face forming a seat for the milk vessel and having an externally-threaded sleeve extension projecting through the opening in the bottom of the cooling vessel and having the inner end of its bore leading to the opening in the bottom of the milk vessel enlarged and made to taper inwardly; in combination with a discharge-pipe screwed to the sleeve extension of said union-piece and a removable strainer comprising a foraminous body and a frame constructed to fit snugly into the enlarged end of the bore of the aforesaid union-piece, for the purpose set forth.

8. A milk-cooling apparatus comprising a plurality of cooling vessels, a milk vessel smaller than and suspended in each of said cooling vessels, means for closing the upper end of both vessels and for admitting air to the milk vessels, a milk-discharge pipe extending from the bottom of a milk vessel through its cooling vessel, and a discharge-pipe near the upper end of each of said cooling vessels; in combination with a reservoir for the cooling agent, a supply-main connected with the reservoir at or near its bottom, distributing-pipes leading from said supply-main, connected with the cooling vessels near their bottom, and means for regulating the flow of liquid from the reservoir to the cooling vessels, substantially as and for the purpose set forth.

9. A milk-cooling apparatus, comprising a plurality of portable cooling vessels and stands therefor, a milk vessel smaller than and suspended in each of said cooling vessels, a discharge-pipe leading from the bottom of the milk vessels and extending through their cooling vessels, and a discharge-pipe for refrigerant at the upper end of each cooling vessel; in combination with a reservoir for a liquid refrigerant provided with level and temperature indicators, a feed and overflow pipe, and one or more distributing-pipes, one of said pipes having branches connected with the cooling vessels near their lower ends, means for regulating the flow of refrigerant to the cooling vessels, and means for intercepting solids held in suspension in the refrigerant before such solids reach the distributing pipe or pipes, for the purpose set forth.

10. A milk-cooling apparatus, comprising a plurality of portable coolers, each comprising a stand, a cooling vessel removably supported therefrom, a milk vessel smaller than and removably suspended in said cooling vessel, a discharge-pipe for milk extending through the bottom of the cooling vessel and communicating with the milk vessel through a separable yet fluid-tight joint which forms a seat for the bottom of said milk vessel, and a refrigerant discharge or overflow pipe near the upper end of each cooling vessel; in combination with a refrigerant-reservoir having level and temperature indicators, supply and overflow pipes, and one or more distributing-pipes, one of said pipes provided with branches connected with the cooling vessels near the bottom thereof, and means for regulating the flow of refrigerant through said distributing-pipe, substantially as and for the purpose set forth.

In witness whereof I have hereunto set my hand in presence of two witnesses.

THEODOR SCHUBERT.

Witnesses:
EMANUEL MEYER,
MORITZ VERTH.